United States Patent [19]

Mayer

[11] 4,294,688
[45] Oct. 13, 1981

[54] HEAT TRANSFER IN MAGNETICALLY STABILIZED, FLUIDIZED BEDS

[75] Inventor: Francis X. Mayer, Baton Rouge, La.

[73] Assignee: Exxon Research & Engineering Co., Florham Park, N.J.

[21] Appl. No.: 131,855

[22] Filed: Mar. 19, 1980

Related U.S. Application Data

[63] Continuation of Ser. No. 737,227, Nov. 1, 1976, abandoned.

[51] Int. Cl.³ .................... C10G 11/00; C10G 15/00
[52] U.S. Cl. ........................................ 208/164; 134/1; 208/108; 208/113; 208/127; 208/134; 208/149; 208/152; 208/213
[58] Field of Search .................. 208/152, 164, 149; 209/212, 213, 214; 34/1; 134/1

[56] References Cited

U.S. PATENT DOCUMENTS

| 2,437,352 | 3/1948 | Fragen | 208/152 |
| 2,742,403 | 4/1956 | Nicholson et al. | 208/55 |
| 2,899,384 | 8/1959 | Swabb et al. | 208/149 |
| 2,933,446 | 4/1960 | MacLaren | 208/149 |
| 3,440,731 | 4/1969 | Tuthill | 204/155 |

Primary Examiner—Delbert E. Gantz
Assistant Examiner—G. E. Schmitkons
Attorney, Agent, or Firm—Roy J. Ott; Llewellyn A. Proctor

[57] ABSTRACT

Heat transfer in a hydrocarbon conversion process utilizing a magnetically stabilized fluid bed reactor and a magnetically stabilized catalyst regenerator is improved by the use of a fluidizable solids mixture comprising substantially inert heat carrier particles and magnetizable catalyst particles wherein the inert particles have settling rates higher than the settling rates of the catalyst particles. The heat carrier particles and the magnetizable catalyst particles are completely or partially separated in settling zones associated with the reactor and regenerator. The separated heat carrier particles and catalyst particles are independently circulated between the reactor and regenerator so that the heat carrier particles can be passed through one or more heat exchangers to provide the desired temperature levels in the system.

10 Claims, 3 Drawing Figures

FIGURE 2
SYSTEM-USING SEPARATE TRANSFER LINES

SETTLING VELOCITY vs CONCENTRATION OF HEAT CARRIER PARTICLES

25/45 MESH 2.2 gm/cc BEADS IN HF-85 ALUMINI 0.75 FT/SEC GAS VELOCITY

40/45 MESH 2.2 gm/cc BEADS IN HF-85 ALUMINI
0.40 FT/SEC GAS VELOCITY
(TWO SERIES OF RUNS)

HEAT CARRIER CONCENTRATION, WT%

SYSTEM-USING SEPARATE TRANSFER LINES

HEAT TRANSFER IN MAGNETICALLY STABILIZED, FLUIDIZED BEDS

This is a continuation, of application Ser. No. 737,227, filed Nov. 1, 1977, now abandoned.

FIELD OF THE INVENTION

This invention relates to a process and apparatus for effecting chemical conversion in a magnetically stabilized fluid bed. More particularly, the invention relates to a hydrocarbon conversion process utilizing a fluidized solids mixture of heat carrier particles and magnetizable catalyst particles in a reactor and a catalyst regenerator which are subjected to a magnetic field.

DESCRIPTION OF THE PRIOR ART

Many chemical and physical reactions such as catalytic cracking, hydrogenation, oxidation, reduction, drying, filtering, etc., are carried out in fluidized beds. A fluidized bed briefly consists of a mass of a particulate solid material in which the individual particles are in continuous motion relative to each other whereby the mass or fluidized bed possesses the characteristics of a liquid. Like a liquid, it will flow or pour freely, there is a hydrostatic head pressure, it seeks a constant level, it will permit the immersion of objects and will support relatively buoyant objects, and in many other properties it acts like a liquid. A fluidized bed is conventionally produced by effecting a flow of a fluid, usually gas, through a porous or perforate plate or membrane underlying the particulate mass, at a sufficient rate to support the individual particles in a relatively continuously moving manner. A minimum air flow or pressure drop is required to produce fluidization and is known as the incipient fluidization and is dependent on many parameters including particle size, particle density, etc. Any increase in the fluid flow beyond incipient fluidization causes an expansion of the fluidized bed to accommodate the increased fluid flow until the fluid velocity exceeds the free falling velocity of the particles which are then carried out of the apparatus.

Fluidized beds possess many desirable attributes, for example, in temperature control, heat transfer, catalytic reactions, and various chemical and physical reactions such as oxidation, reduction, drying, polymerization, coating, diffusion, filtering and the like. However, the establishment and maintenance of a stable fluidized bed by conventional procedures is a sensitive and difficult process possessing many drawbacks and disadvantages.

Among the problems associated with fluidized beds, a most basic one is that of bubble formation, frequently resulting in slugging, channeling, spouting and pneumatic transport; this problem is most common in gas-fluidized systems. The problem necessitates critical flow control and effects design factors such as minimum fluidization velocities, pressure drops, particle sizes, etc. Bubbling causes both chemical and mechanical difficulties for example, in gas-solids reactions gas bubbles may bypass the particles altogether resulting in lowered contacting efficiency.

Ideally, a fluidized bed should be free of bubbles, homogeneous, maintain particle suspension and manifest non-critical flow velocity control for various bed heights and bed densities. Many procedures and systems have been proposed to effect improvements, for example, by the use of baffles, gas distribution perforated plates, mechanical vibration and mixing devices, the use of mixed particle sizes, gas plus liquid flow schemes, special flow control valves, etc.

More recently, it has been disclosed in U.S. Pat. Nos. 3,304,249; 3,440,731; and 3,439,899 that certain improvements in fluidized beds can be effected by applying a magnetic field to a fluidized bed of particulate solids having ferromagnetic properties.

In general, the use of a magnetically stabilized, fluidized bed minimizes solids back mixing and eliminates gas by-passing of the fluidized solids by preventing gas bubble formation. The elimination of back mixing in certain operations such as cat cracking, reforming, hydrofining, hydrocracking, drying, etc., is particularly advantageous since it prevents back mixing of feed and products and thereby results in a greater selectivity to desirable products. Unfortunately, the advantages associated with the elimination of back mixing are partially offset by the poorer heat transfer due to less violent agitation of the fluidized solid particles. Such a decrease in heat transfer could cause hot spots on the catalyst particles and leads to deactivation of the catalyst, side reactions, selectivity loss, etc. In addition, temperature control may be more difficult in certain reactions such as catalytic cracking, catalytic reforming, hydrocracking, hydrogenation, etc., which are highly exothermic or endothermic in nature.

The problems associated with the use of a magnetically stabilized, fluidized bed as regards heat transfer deficiencies are minimized or eliminated by the process of the present invention which utilizes a particulate solids mixture containing a plurality of separate, discrete (1) substantially inert heat carrier particles, and (2) magnetizable catalyst particles where the heat carrier particles are circulated independently of the catalyst particles to provide the desired temperature levels in the system.

SUMMARY OF THE INVENTION

A hydrocarbon conversion process which comprises (a) contacting a hydrocarbon feedstock in a conversion zone having a magnetic field applied thereto with a fluidizable particulate solids mixture containing a plurality of separate discrete substantially inert heat carrier particles and magnetizable catalyst particles, said substantially inert heat carrier particles having settling rates higher than the settling rates of said catalyst particles; (b) permitting said heat carrier particles to settle in preference to the catalyst particles in a settling zone communicating with said conversion zone; (c) circulating said catalyst particles from the settling zone to a regeneration zone having a magnetic field applied thereto; (d) circulating said heat carrier particles from the settling zone to a heat exchanger means and thereafter to said regeneration zone, said circulation of heat carrier particles being independent of the circulation of catalyst particles; (e) contacting said catalyst particles in the presence of said heat carrier particles with oxygen at elevated temperatures to burn coke deposited upon said catalyst particles; (f) permitting said heat carrier particles to settle in preference to the catalyst particles in a settling zone communicating with said regeneration zone; (g) circulating said catalyst particles from the regeneration zone to a conversion zone having a magnetic field applied thereto; and (h) circulating said heat carrier particles from the settling zone to a heat exchanger means and thereafter to said reaction zone, said circulation of heat carrier particles being independent of the circulation of catalyst particles.

The substantially inert heat carrier particles which comprise the particulate solids mixture are preferably magnetizable solids. By substantially inert is meant that the particles exert no catalytic influence on the chemical reaction occurring in the reaction zone. The heat carrier particles will include any known heat transfer materials such as alumina, mullite, porcelain, steel, etc. The heat carrier particles will preferably include ferromagnetic and ferrimagnetic substances including but not limited to magnetic $Fe_3O_4$, $\alpha$-iron oxide ($Fe_2O_3$), ferrites of the form $MO.Fe_2O_3$, wherein M is a metal or mixture of metals such as Zn, Mn, Cu, etc.; ferromagnetic elements including iron, nickel, cobalt and gadolinium, alloys of ferromagnetic elements, etc.

The magnetizable catalyst particles will comprise one or more of the aforedescribed ferromagnetic and ferrimagnetic substances and a catalytic material chosen to effect the reaction desired. Accordingly, the magnetizable catalyst particles of the invention will include a vast number of conventional catalysts which are known to catalyze the desired reaction. Examples of catalysts useful herein include those catalysts conventionally employed in such processes as fluid catalytic cracking, reforming, hydrogenation, hydrocracking, isomerization, alkylation, polymerization, oxidation, etc.

The fluid catalytic cracking catalyst which may be used in the process of the invention include the highly active zeolite-containing catalysts and the amorphous silica-alumina catalysts.

In general, the zeolite-type catalysts are exemplified by those catalysts wherein a crystalline aluminosilicate is dispersed with a siliceous matrix. Among the well recognized types of zeolites useful herein are the "Type A", "Type Y", "Type X", "Type ZSM", mordenite, faujasite, erionite, and the like. A further description of these zeolites and their methods of preparation are given, for example, in U.S. Pat. Nos. 2,882,243; 2,882,244; 3,130,007; 3,410,808; 3,733,390; 3,827,968 and patents mentioned therein, all incorporated herein by reference. Because of their extremely high activity, these zeolite materials are deposited with a material possessing a substantially lower level of catalytic activity such as a siliceous matrix material which may be of the synthetic, semi-synthetic or natural type. The matrix materials may include silica-alumina, silica-gel, silica-magnesia, alumina and clays such as montmorillonite, kaolin, etc.

The zeolite which is preferably incorporated into the matrix is usually exchanged with various cations to reduce the alkali metal oxide content thereof. In general, the alkali metal oxide content of the zeolite is reduced by ion exchange treatment with solutions of ammonium salt, or salts of metals in Groups II to VIII of the Periodic Table or the rare earth metals. Examples of suitable cations include hydrogen, ammonium, calcium, magnesium, zinc, nickel, molybdenum and the rare earths such as cerium, lanthanum, praseodymium, neodymium, and mixtures thereof. The catalyst will typically contain 2-25% of the zeolite component and 75-98% of the matrix component. The zeolite will usually be exchanged with sufficient cations to reduce the sodium level of the zeolite to less than 5 wt. %, preferably less than 1 wt. %. Other specific examples of these types of catalysts are found, for example, in U.S. Pat. Nos. 3,140,249; 3,140,251; 3,140,252 and 3,140,253, which are incorporated herein by reference.

When used in hydrotreating or hydrofining reactions the catalyst component will contain a suitable matrix component, such as those mentioned heretofore and one or more hydrogenating components comprising the transition metals, preferably selected from Groups VI and VIII of the Periodic Table. Examples of suitable hydrogenating metals which may be supported upon a suitable matrix include, among others, nickel, cobalt, molybdenum, tungsten, platinum, and palladium, ruthenium, rhenium, iridium (including the oxides and sulfides thereof). Mixtures of any two or more of such hydrogenating components may also be employed. For example, catalysts containing (1) nickel or cobalt, or the combination thereof, in the form of metal, oxide, sulfide or any combination thereof, and (2) molybdenum or tungsten, or the combination thereof, in the form of metal, oxide, sulfide or any combination thereof are known hydrofining catalysts. The total amount of hydrogenating component supported on the matrix may range from 2 to 25 wt. %, (calculated as metal) usually 5 to 20 wt.% based on the total weight of the catalyst composition. A typical hydrofining catalyst includes 3 to 8 wt.% CoO and/or NiO and about 8 to 20 wt.% $MoO_3$ and/or $WO_3$ (calculated as metal oxide).

Examples of reforming catalysts which may be used in accordance with the invention are those catalysts comprising a porous solid support and one or more metals (or compounds thereof, e.g. oxides) such as platinum, iridium, rhenium, palladium, etc. The support material can be a natural or a synthetically produced inorganic oxide or combination of inorganic oxides.

Typical acidic inorganic oxide supports which can be used are the naturally occurring aluminum silicates, particularly when acid treated to increase the activity, and the synthetically produced cracking supports, such as silica-alumina, silica-zirconia, silica-alumina-magnesia, and crystalline zeolitic aluminosilicates. Generally, however, reforming processes are preferably conducted in the presence of catalysts having low cracking activity, i.e., catalysts of limited acidity. Hence, preferred carriers are inorganic oxides such as magnesia and alumina. Other examples of suitable reforming catalysts are found in U.S. Pat. Nos. 3,415,737; 3,496,096; 3,537,980; 3,487,009; 3,578,583; 3,507,780; and 3,617,520, which are incorporated herein by reference.

Preferably, the particles which are fluidized in the process of this invention will have a magnetization of at least 250 gauss, more preferably up to 3,000 gauss, and will range in particle size of from 0.001 mm to 50 mm, more preferably from 0.15 mm to 1.0 mm. Particle magnetization determines the stability of the bed and sets the operable velocity range for particles of a given particle size. Ferromagnetic content and applied field are used to control particle magnetization. Particle magnetization is difficult to predict precisely and magnetic measurements are generally made on particles of different sizes and ferromagnetic content. Curves of magnetization vs. applied field are obtained for design purposes. Particles of dimensions greater than 50 mm will be difficult, of course, to fluidize, while particles smaller than 0.001 mm will be difficult to contain in any fluidized process. In addition, the larger the magnetization of the particles, the higher will be the transition velocity up to which the fluidized bed may be operated without bubbling, all other factors held constant.

The magnetizable catalyst particles of the invention will contain 1 to 75, usually 5 to 50, wt.% (based on total weight of the particle) of the aforedescribed magnetic material and may be prepared by conventional techniques, such as by impregnating the aforedescribed zeolitic and/or inorganic oxide catalytic materials with a soluble precursor of a ferromagnetic substance which is subsequently reduced or oxidized to render the particles ferromagnetic. Alternatively, the ferromagnetic material may be incorporated into the catalyst component by encapsulation of finely divided ferromagnetic material.

The particulate solids mixture of the invention may comprise various amounts of the heat carrier particles and the magnetizable catalyst particles. In general, the particulate solids mixture will contain 1 to 15, preferably 1 to 10, volume % of the heat carrier particles and 85 to 99, preferably 90 to 99 volume % of the magnetizable catalyst particles.

The size and density of the heat carrier particles and the catalyst particles are chosen so that the heat carrier particles may be separated from the catalyst particles by gravity settling in separation zones communicating with the reactor and regenerator zones. Accordingly, the heat carrier particles will have a significantly higher settling rate than the catalytic particles since the heat carrier particles will be heavier and/or larger than the catalyst particles. The relative density and size of the heat carrier and catalyst particles will be such that settling velocities of the inert heat carrier will range between 0.04 and 0.4 ft./sec. The settling rate for the heat carrier is a function of the heat carrier concentration and the effective viscosity of the catalyst bed. The settling rate can be determined experimentally for the particular reaction system employed. Data generally follow Stokes' law and can be estimated using the effective viscosity of the bed and particle size. Typical data on 2.2 gm/cc beads in alumina are shown in FIG. 1.

Heat carrier concentration also varies with bed height and can be determined using the following relationship:

$$c = \frac{W_b}{V} e^{-VY/D} + \frac{W_t}{V}$$

where:
c = heat carrier concentration, lbs./cu. ft.
V = settling rate, ft./sec.
$W_t$ = rate heat carrier is fed in at the top, lbs./(sec.×sq. ft.)
$W_b$ = rate heat carrier is picked up from the bottom, lbs./(sec.×sq. ft.)
D = diffusion coefficient of the bed, ft.$^2$/sec.
Y = height above heat carrier-catalyst interface (e.g. I of FIG. 2), ft.

Typical concentration profiles calculated using this equation show large concentrations near the bottom of the bed. This is due to the first term in the equation. At large values of bed height concentration becomes constant and equals $W_t/V$.

The operating conditions to be employed in the practice of the present invention are well known and will, of course, vary with the particular conversion reaction desired. The following table summarizes typical reactor conditions effective in the present invention.

| Principal Conversion Desired | Reaction Conditions | | | |
|---|---|---|---|---|
| | Temperature, °F. | Pressure, p.s.i.g. | Feed Rate V/V/Hr. | Hydrogen Rate s.c.f./bbl. |
| Hydrofining | 500–800 | 50–2,000 | 0.1–10.0 | 500–10,000 |
| Hydrocracking | 450–850 | 200–2,000 | 0.1–10.0 | 500–10,000 |
| Catalytic Cracking | 700–1,000 | 0–50 | 0.1–20.0 | 0 |
| Catalytic Reforming | 850–1,000 | 50–1,000 | 0.1–20.0 | 500–10,000 |

The feedstocks suitable for conversion in accordance with the invention include any of the well-known feeds conventionally employed in hydrocarbon conversion processes. Usually, they will be petroleum derived, although other sources such as shale oil and coal are not to be excluded. Typical of such feeds are heavy and light virgin gas oils, heavy and light virgin naphthas, solvent extracted gas oils, coker gas oils, steam-cracked gas oils, middle distillates, steam-cracked naphthas, coker naphthas, cycle oils, deasphalted residua, etc.

The heat carrier particles and the catalyst particles which are separated in the reactor and regenerator separation zones are independently circulated through the system. In order to compensate for heat effects in the reactor and the regenerator, the heat carrier particles are recycled at a rate to keep the system in heat balance. Heat exchangers are employed to add or withdraw heat to or from the heat carrier particles circulated between the reactor and regenerator.

The application of a magnetic field to the reactor and the catalyst regenerator in accordance with the invention is not to be limited to any specific method of producing the magnetic field. Conventional permanent magnets and/or electromagnets can be employed to provide the magnetic field used in the practice of this invention. The positioning of the magnets will, of course, vary with the solids used, degree of fluidization required and the effects desired. In the preferred embodiment of this invention, a toroidally shaped electromagnet is employed to surround at least a portion of the fluidized bed as this provides those skilled in the art with an excellent method of achieving near uniform magnetic force and stability throughout the bed. Such electromagnets when powered by direct current with the use of a rheostat are particularly desirable for applying a magnetic field to the bed particles and to provide an excellent method of stabilizing the fluidization of the bed particles in response to changing flow rates of the fluidizing medium.

The invention is not limited by the shape or positioning of the magnet employed to produce the magnetic field. The magnet can be of any size, strength or shape and can be placed above or below the bed to achieve special effect. The magnets employed in this invention can be placed within or without the vessel and may even be employed as an integral portion of the vessel structure itself. The process is not limited to any particular vessel material and it can be readily adopted for use in reactors currently employed by industry.

The degree of magnetic field to be applied to the fluidized solids in the reaction zone will, of course, depend on the desired magnetization for the ferromagnetic particles and the amount of stabilization desired. Particulate solids having weak ferromagnetic properties, e.g. cobalt, nickel, etc. will require the application of a stronger magnetic field than particulate solids having strong ferromagnetic properties, e.g., iron, to achieve similar stabilization effects. The size and shape of the solids will also obviously have an effect on the strength of the magnetic field to be employed. However, since the strength of the field produced by an electromagnet can be finely adjusted by adjusting the field strength of the electromagnet, an operator can readily adjust the field strength employed to achieve the desired degree of stabilization for the particular system employed. Specific methods of applying the magnetic field are also described in U.S. Pat. Nos. 3,440,731 and 3,439,899 and Belgian Patent No. 834,384, which are incorporated herein by reference.

PREFERRED EMBODIMENTS OF THE INVENTION

Figure 1:
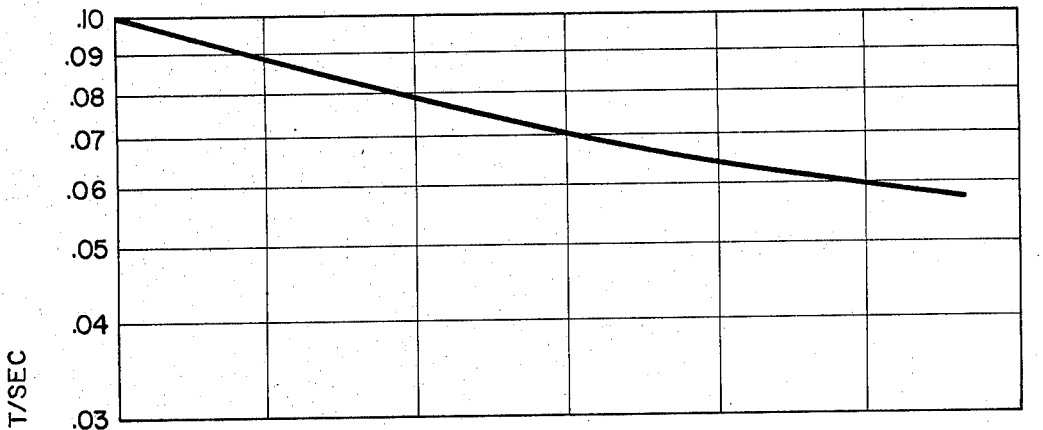
Figure 1:
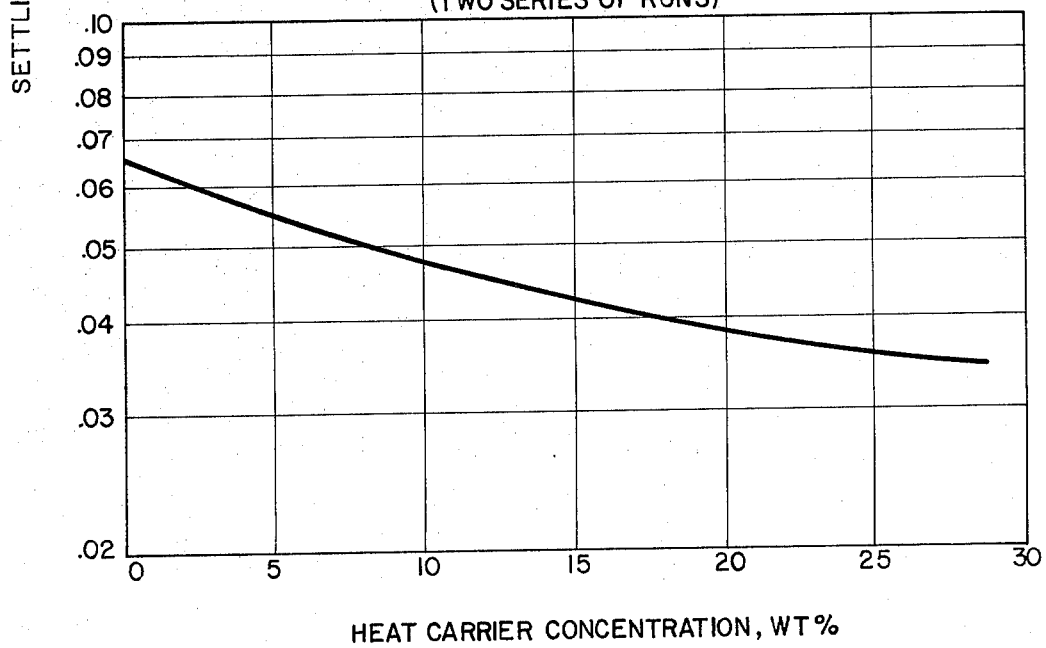
Figure 2:
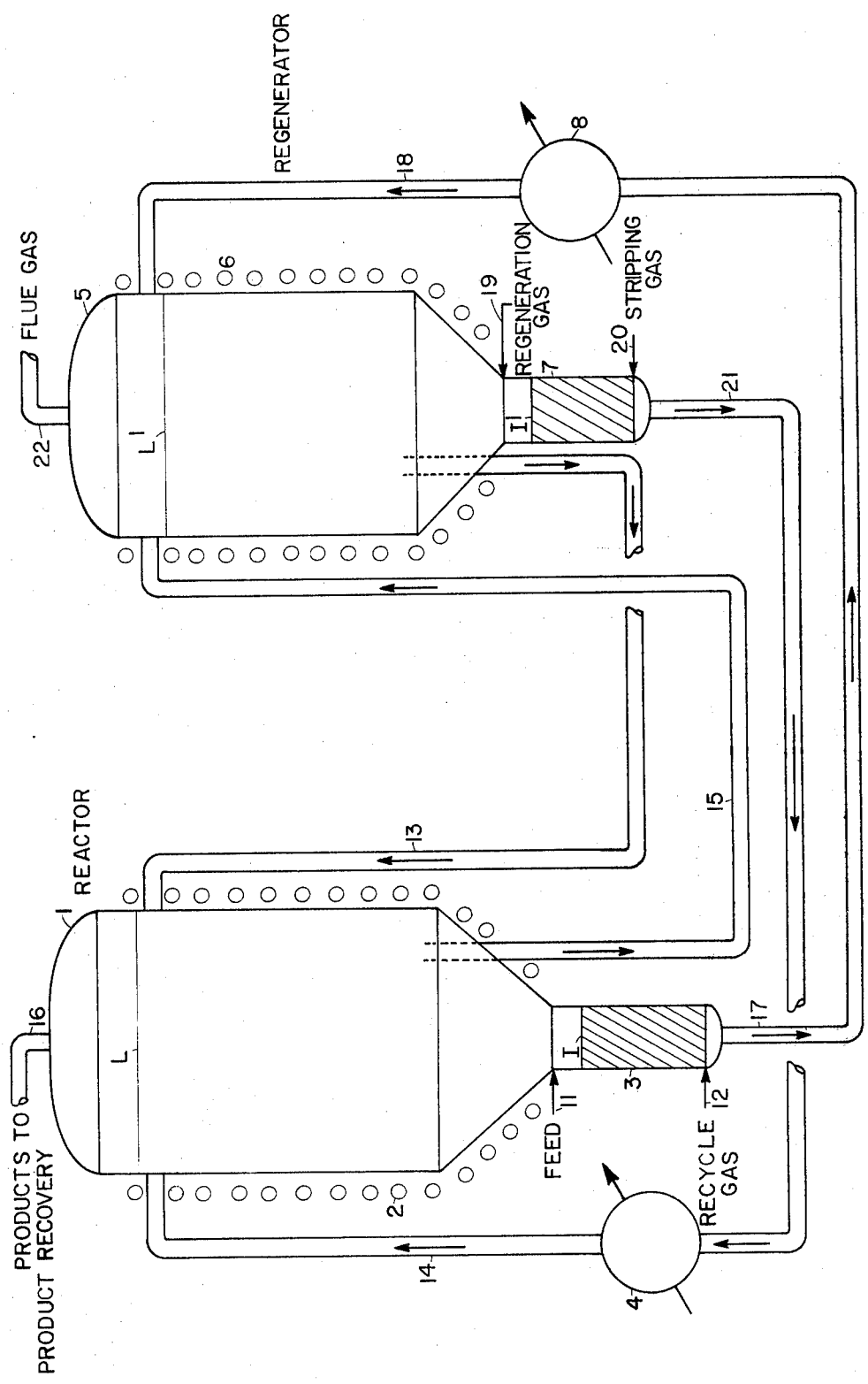
FIGS. 2 and 3 are diagrammatic flow plans illustrating specific embodiments of the invention.

Referring to FIG. 2, a naphtha feed boiling in the range of 200°-375° F., hydrogen recycle gas, ferromagnetic catalyst particles and ferromagnetic substantially inert heat carrier particles are introduced into reforming reactor 1 via lines 11, 12, 13, and 14, respectively. Reactor 1 is surrounded by electromagnetic coil 2 which is powered by a direct current source (not shown). Electromagnetic coil 2 is arranged to apply a substantially uniform field on the particle solids charge in reactor 1. In this particular example, electromagnetic coil 2 provides a uniform magnetic field of 500 Oersteds.

The ferromagnetic heat carrier particles are stainless steel (400 series) particles having a particle size in the range of 400-800 microns. The ferromagnetic catalyst which is introduced into reactor 1 via line 13 is a commerically available reforming catalyst which has been combined with 6 wt.% of stainless steel (400 series) by encapsulation of the stainless steel with the alumina base. The reforming catalyst contains 10 wt.% $MoO_3$ on an alumina base (wt.% excludes weight of ferromagnetic material).

Settling zone 3 is connected to reactor 1 for separation of the heat carrier and catalyst particles. Recycle gas furnished through line 12 is introduced into reactor 1 via settling zone 3.

The heat carrier particles are coarse and have a higher density than the catalyst particles. Depending upon the heat carrier circulation rate and settling velocity, a concentration gradient is established from the top level (designated L) of reactor 1 to the interface (designated I) in settling zone 3. Thus, the concentration of the heat carrier solids is virtually 0 at L and virtually 100% at I. The heat carrier particles which settle out in settling zone 3 are withdrawn therefrom by means of line 17 which delivers the heat carrier particles to heat exchange zone 8 for removal of heat as desired from the system prior to transfer to regenerator 5 by means of line 18. The spent ferromagnetic reforming catalyst is removed from reactor 1 via line 15 for delivery to regenerator 5. The upgraded naphtha product from reactor 1 is withdrawn from line 16. The lines for transferring the various streams are equipped with valves (not shown) to regulate the flow to a desirable level.

The spent catalyst from reactor 1 is regenerated in regenerator 5 by contacting the spent catalyst with air introduced via line 19 at a temperature of about 1125° F. Regenerator 5 is connected to settling zone 7 for removal of the heat carrier particles as in the aforedescribed reactor-settling zone system. Stripping gas is introduced into settler 7 via line 20. Regenerator 5 is surrounded by electromagnetic coil 6 which is arranged to apply a substantially uniform field on the particulate solid charge therein. The electromagnetic field to be applied to regenerator 5 is 500 Oersteds. The physical operation in the regenerator-settling zone system parallels that of the reactor-settling zone system with the concentration gradient for the heat carrier particles varying from virtually 0 to L' to virtually 100% at I'. The heat carrier particles which separate from settling zone 7 are delivered via line 21 to heat exchange zone 4 wherein heat may be added and the particles thereafter transferred by means of line 14 to reactor 1. The regenerated catalyst particles are removed from regenerator 5 by means of line 13 for delivery to reactor 1. The flue gas from regenerator 5 exits via line 22.

The operating conditions and yields for the aforedescribed process scheme are shown in Table 1 below.

Various modifications may be made to the process flow plan depicted in FIG. 2. For example, admixtures of heat carrier and catalyst particles could be circulated between reactor 1 and regenerator 5 by joining line 15 with line 17 prior to heat exchanger 8 and by joining line 13 with line 21 prior to heat exchanger 4.

Figure 3:
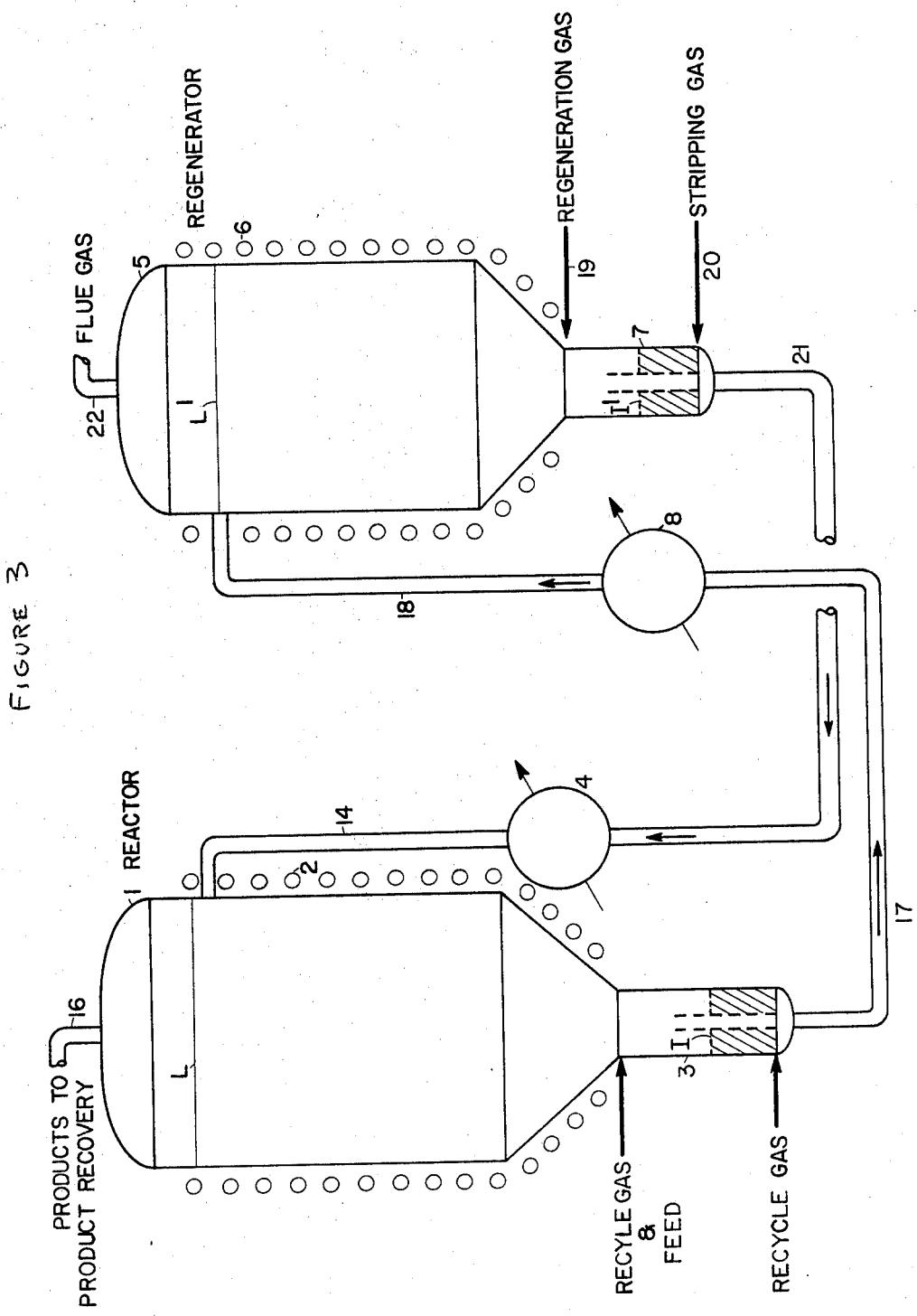

A further modification of the process flow plan of FIG. 2 is shown in FIG. 3 wherein the ratio of heat carrier and catalyst circulated together in the transfer lines connecting reactor 1 and regenerator 5 is controlled by withdrawing the admixture above the heat carrier interfaces I and I'. As shown in FIG. 3, transfer lines 17 and 21 extend into settling zones 3 and 7, respectively. Since the concentration of heat carrier solids is virtually 0 at L and L' and virtually 100% at I and I', the position above interfaces I and I' is adjusted so that the proper ratio of heat carrier and catalyst required for heat balance is obtained.

TABLE I

| CATALYTIC REFORMING CONDITIONS | |
|---|---|
| Feed: 200°-375° F. Naphtha | |
| Reactor Conditions | |
| Temperature, °F. | 900 |
| Pressure, psig | 200 |
| Feed Rate, W/Hr./W | 0.45 |
| Reactor Catalyst Holding Time, Hrs. | 2.0 |
| Reactor Velocity Above Feed Inlet, ft./sec. | 0.30-0.60 |
| Reactor Stripper Velocity, ft./sec. | 0.88 |
| Catalyst/Oil Ratio | 1.0 |
| Heat Carrier/Catalyst Ratio | 2.0-4.0 |
| Recycle Gas, SCF/B | 4500 |
| $H_2$/Oil Ratio | 3.0 |
| Reactor Yields | |
| Res. ON | 85-95 |
| Vol. % $C_5^+$ | 80.4 |
| Vol. % $C_4^+$ | 4.1 |
| Wt. % $C_3^-$ | |
| Wt. % Carbon | 0.8 |
| Particulate Solids | |
| Heat Carrier Density, lb./ft.$^3$ | 195 |
| Heat Carrier Particle, Microns | 400-800 |
| Heat Carrier, Wt. % Ferromagnetic | 50 |
| Catalyst Density, lb./ft.$^3$ | 69-78 |
| Catalyst Particle Size, microns | 70-250 |
| Catalyst Wt. % Ferromagnetic | 6 |
| Regenerator Conditions | |
| Temperature, °F. | 1125 |
| Pressure, psig | 200 |
| Regenerator Velocity, ft./sec. | 0.35-0.60 |

What is claimed is:

1. A hydrocarbon conversion process which comprises (a) contacting a hydrocarbon feedstock in a conversion zone having a magnetic field applied thereto with a fluidizable particulate solids mixture containing a plurality of separate discrete substantially inert heat carrier particles and magnetizable catalyst particles, said substantially inert heat carrier particles having settling rates higher than the settling rates of said catalyst particles; (b) permitting said heat carrier particles to settle in preference to the catalyst particles in a settling zone communicating with said conversion zone; (c) circulating said catalyst particles from the conversion zone to a regeneration zone having a magnetic field applied thereto; (d) circulating said heat carrier particles from the settling zone to said regeneration zone, said circulation of heat carrier particles being independent of the circulation of catalyst particles; (e) contacting said catalyst particles in the presence of said heat carrier particles with oxygen at elevated temperatures to burn coke deposited upon said catalyst particles; (f) permitting said heat carrier particles to settle in preference to the catalyst particles in a settling zone communicating with said regeneration zone; (g) circulating said catalyst particles from the regeneration zone to a conversion zone having a magnetic field applied thereto; and (h) circulating said heat carrier particles from the settling zone to said reaction zone, said circulation of heat carrier particles being independent of the circulation of catalyst particles.

2. The process of claim 1 wherein said heat carrier particles are magnetizable.

3. The process of claim 2 wherein the heat carrier particles from the settling zone in step (d) are circulated to a heat exchanger means prior to transfer to the regeneration zone, and wherein the heat carrier particles from the settling zone in step (g) are circulated to a heat exchanger means prior to transfer to the reactor zone.

4. The process of claim 2 wherein said magnetic fields are uniform and oriented substantially axially to the flow of fluid in said reactor zone.

5. The process of claim 3 wherein a magnetic field is applied to said settling zone.

6. The process of claim 4 wherein said particulate solids mixture comprises 1 to 15 vol. % of the heat carrier particles and 85 to 99 vol. % of the magnetizable catalyst particles.

7. A hydrocarbon conversion process which comprises: (a) contacting a hydrocarbon feedstock in a conversion zone having a magnetic field applied thereto with a fluidizable particulate solids mixture containing a plurality of separate discrete substantially inert heat carrier particles and magnetizable catalyst particles, said substantially inert heat carrier particles having settling rates higher that the settling rates of said catalyst particles; (b) permitting said heat carrier particles to settle in preference to the catalyst particles in a settling zone communicating with said conversion zone; (c) circulating said heat carrier particles and said catalyst particles from the settling zone to a regeneration zone having a magnetic field applied thereto; (d) contacting said catalyst particles in the presence of said heat carrier particles with oxygen at elevated temperatures to burn coke deposited upon said catalyst particles; (e) permitting said heat carrier particles to settle in preference to the catalyst particles in a settling zone communicating with said regeneration zone; and (f) circulating said heat carrier particles and said catalyst particles from the regeneration zone to a conversion zone having a magnetic field applied thereto.

8. The process of claim 7 wherein said heat carrier particles are magnetizable.

9. The process of claim 8 wherein the heat carrier particles and catalyst particles from the settling zone in step (c) are circulated to a heat exchanger means prior to transfer to the regeneration zone and wherein the heat carrier particles and catalyst particles from the settling zone in step (f) are circulated to a heat exchanger means prior to transfer to the reaction zone.

10. The process of claim 9 wherein said magnetic fields are uniform and oriented substantially axially to the flow of fluid in said reaction zone.

* * * * *